(12) United States Patent
Raman et al.

(10) Patent No.: US 10,061,872 B1
(45) Date of Patent: Aug. 28, 2018

(54) TECHNIQUES FOR SUPPRESSING UNWANTED CLASHES

(71) Applicant: Bentley Systems, Incorporated, Exton, PA (US)

(72) Inventors: Ramanujam Raman, Exton, PA (US); Colin Kerr, Philadelphia, PA (US)

(73) Assignee: Bentley Systems, Incorporated, Exton, PA (US)

( * ) Notice: Subject to any disclaimer, the term of this patent is extended or adjusted under 35 U.S.C. 154(b) by 212 days.

(21) Appl. No.: 15/254,718

(22) Filed: Sep. 1, 2016

(51) Int. Cl.
*G06F 17/50* (2006.01)
*G06F 17/30* (2006.01)

(52) U.S. Cl.
CPC ........ *G06F 17/50* (2013.01); *G06F 17/30404* (2013.01); *G06F 17/30507* (2013.01); *G06F 17/30595* (2013.01)

(58) Field of Classification Search
None
See application file for complete search history.

(56) References Cited

U.S. PATENT DOCUMENTS

| 5,497,453 | A | 3/1996 | Megahead et al. |
| 6,907,573 | B2 | 6/2005 | Kohls et al. |
| 7,418,666 | B2 | 8/2008 | Cortesi et al. |
| 8,554,521 | B2 | 10/2013 | Diguet et al. |
| 2004/0189632 | A1* | 9/2004 | Taguchi ............... G06F 3/04842 345/418 |
| 2009/0138243 | A1* | 5/2009 | Tokumaru ............... G06F 17/50 703/1 |
| 2015/0310134 | A1 | 10/2015 | Sireeni |
| 2017/0147714 | A1* | 5/2017 | Chen ..................... G06F 17/50 |

OTHER PUBLICATIONS

"Autodesk® User Guide," Autodesk, Inc., Apr. 2011, pp. 1-868.
"Bentley Navigator V8i: (SELECTseries 3) User Essentials 08.11.08.43," Bentley Institute Course Guide, Bentley Institute, Bentley Systems, Incorporated, May 2011, pp. 1-184.
Johnson, Corey, "3D Model in Construction Now What?," Bentley Systems, Incorporated, Mar. 2013, pp. 1-26.

* cited by examiner

*Primary Examiner* — Craig C Dorais
(74) *Attorney, Agent, or Firm* — Cesari and McKenna, LLP; James A. Blanchette

(57) ABSTRACT

In example embodiments, techniques are provided for suppressing unwanted clashes between elements of a CAD project. A software application receives a user-defined script for a clash suppression rule that includes at least an abstraction-based query and control flow statements. The application executes the user-defined script for a given clash by mapping the abstraction-based query to a query of a relational database that maintains element data for the CAD project, returning element data from the relational database in response to the query, and evaluating the returned element data using the control flow statements to determine whether the given clash is an unwanted clash. The given clash is suppressed in response to determining the given clash is an unwanted clash.

20 Claims, 13 Drawing Sheets

```
 * continue processing.
 */ if (!rows || rows.length == 0)
    return false; /* continue processing this clash */

/*
 * Check if the connection points of one element lies in the line joining the
 * points of the other.
 */
var pointArray1 = rows[0][0];
var pointArray2 = rows[0][1];
if (RuleHelper.IsPointArrayWithinLine(pointArray2, pointArray1,
    parameters.tolerance)) {
    clash["ResultStatus"] = ResultStatusEnum.Suppressed;
    return true; /* i.e., stop processing clash. It's suppressed */
} return false; /* continue processing this clash */
}
};
```

```
var rule = {
    "summary": "Suppress clashes where pipe branches are inserted in a pipe",
    "definition": "Suppression/Definition/Generic/ConnectPointsAreOnLine",
    "priority": 50,
    "isActive": true,
    "parameters": {
        "propertyName1": "ConnectionPoints",
        "propertyName2": "ConnectionPoints",
        "tolerance": 0.03
    }
};

RuleDefinitions["Suppression/Definition/Generic/ConnecPointAreOnLine"] = {
    summary: "Suppress clashes between elements which have connection points" +
                " on the same line",
    description: "Suppress clashes if one of the elements has {propertyName1}" +
                " on the line created by the {propertyName2} on the other " +
                " element.  Accept points {tolerance} away from the line.",
    category: "Suppression",
    context: {
        postDetection: true, /* i.e., Execute this rule after a potential clash has been
                              * determined by a geometric check */
        type: "Generic"
    },
    parameterDefinitions: {
        // e.g., "propertyName1": "ConnectionPoints"
        propertyName1: RuleUiHelper.PointArrayPropertyParameterDefinition, // e.g., "propertyName2": "ConnectionPoints"
        propertyName2: RuleUiHelper.PointArrayPropertyParameterDefinition, // e.g., "tolerance": 0.03
        tolerance: RuleUiHelper.ToleranceParameterDefinition
    },
```

FIG. 9A

```
process: function (
    clash /* potential clash */,
    parameters /* user parameters: see rule above that sets up the parameters
               * passed in */
) {

/*
     * Construct ECSQL expression to retrieve the ConnectPoints of both elements
     *
     * e.g., ecSql = "SELECT Element1.ConnectionPoints, Element2.ConnectionPoints
     *                FROM plant.Branch AS Element1, plant.Pipe AS Element2
     *                WHERE Element1.ECInstanceId = :elementId1
     *                  AND Element2.ECInstanceId = :elementId2"
     */
    var ecSql = "SELECT Element1." + parameters.propertyName1 +
                ", Element2." + parameters.propertyName2 +
            " FROM " + clash.QualifiedClassName1 + " AS Element1, " +
                      clash.QualifiedClassName2 + " AS Element2" +
            " WHERE Element1.ECInstanceId = :elementId1 " +
            "   AND Element2.ECInstanceId = :elementId2";

/*
     * Setup the bindings to the two clashing elements before the ECSQL statement
     * can be executed
     */
    var bindings = [{ name: "elementId1", value: clash.ElementId1, isInt64: true },
                    { name: "elementId2", value: clash.ElementId2, isInt64: true }];
    var stepCount = 1;

/*
     * Execute the ECSQL statement to fetch the rows
     */
    var rows = RuleHelper.ExecuteECSql(ecSql, bindings, stepCount);

/*
     * If there aren't any rows, the clash cannot be suppressed by the rule -
```

FIG. 9B

```
     * continue processing.
     */ if (!rows || rows.length == 0)
        return false; /* continue processing this clash */

/*
     * Check if the connection points of one element lies in the line joining the
     * points of the other.
     */
    var pointArray1 = rows[0][0];
    var pointArray2 = rows[0][1];
    if (RuleHelper.IsPointArrayWithinLine (pointArray2, pointArray1,
        parameters.tolerance)) {
        clash["ResultStatus"] = ResultStatusEnum.Suppressed;
        return true; /* i.e., stop processing clash. It's suppressed */
    } return false; /* continue processing this clash */
    }
};
```

FIG. 9C

TECHNIQUES FOR SUPPRESSING UNWANTED CLASHES

BACKGROUND

Technical Field

The present disclosure relates generally to reviewing and validating computer aided design (CAD) projects, and more specifically to techniques for suppressing unwanted clashes between elements of a CAD project.

Background Information

To better manage the complexities of physical systems, engineers and other users often turn to CAD. Using a CAD application, a user may construct a model (e.g., a 2-D or 3-D model) of a physical system, where the model is composed of a number of individual elements that correspond to physical components. Each element typically is associated with element data that describes the size, materials, ratings, source, and other characteristics of the specific physical component. The elements may be arranged within a modeling space of the CAD application and interconnected to each other (e.g., at connection points) to represent the configuration of components in the physical system. For example, if the model represents a pipe network, then individual elements may represent individual pipes, elbows, gaskets, valves, etc. having characteristics such as a diameter, thickness, schedule, manufacturer, etc. Depending on the system, the physical components represented by elements will vary.

One or more individual models may be aggregated together into a CAD project. When designing complex physical systems, it is common for different design teams or departments to work on different portions of the CAD project, creating different models or portions of models largely in isolation from each other. These assemblies are later brought together in a design review stage, where any potential design problems are evaluated and addressed. One issue that may potentially be a design problem is a "clash." As used herein the term "clash" refers to an intersection between the geometry of two or more elements that may or may not represent an actual design problem.

Some clashes are not problematic. For example, certain clashes may be intentional aspects of the design. FIG. 1 is a view of an example CAD project 100 including an example elbow element 110 and pipe element 120 that clash because they intentionally touch. As shown in the figure, the geometry of the elbow element 110 touches the geometry of the pipe element 120 by design, since the elbow is intended to be connected to the pipe. The resulting clash between the elbow element 110 and the pipe element 120 does not represent a design problem, but instead is an intended aspect of the physical system.

Similarly, other clashes may be harmless side effects of approximations of complex geometries. FIG. 2 is a view of an example CAD project 200 including a gasket element 210 and a pipe element 220 that clash due to an approximation. The gasket element 210 intersects a flange of a pipe element 220, since the geometry of the flange is only an approximation. The resulting clash between the gasket element 210 and the pipe element 220 does not represent a design problem as the exact geometric configuration of these elements is not important; it is simply important that the flange has a gasket.

Other clashes may represent actual design problems. For example, elements of different models or portions of models created by different design teams may unintentionally collide in such a way that the system is unconstructable in real life. FIG. 3 is a view of an example CAD project 300 including a first pipe element 310 and a second pipe element 230 that clash due to an unintentional collision. The first pipe element 310 partially occupies the same physical space as the second pipe element 230, rendering a system that is unconstructable. The resulting clash between the first pipe element 310 and the second pipe element 320 represents an actual design problem that likely was caused by an oversight or a lack of communication among different design teams that should be addressed during design review.

When modeling a complex physical system, a large number of clashes are typically produced, including ones that represent actual design problem and ones that represent non-problematic issues. It would take a long amount of time for a reviewer to manually validate each clash. The user's time is wasted examining clashes that represent non-problematic issues; clashes they do not want to be examining in the first place. As used herein, the term "unwanted clash" refers to a clash that does not represent an actual design problem, such as a clash due to elements intentionally touching or due to a geometry approximation. An "unwanted clash" is unwanted in the sense that its identification does not aid design review.

Some design review software applications attempt to automatically suppress unwanted clashes (i.e., hide or otherwise not identify unwanted clashes) to speed design validation and reduce costs of the design review process. However, determining which clashes to suppress is inherently heuristic, being dependent to the particular type of physical system being modeled, the model environment and other project-specific factors. Logic cannot readily be generalized to deal with all the different types of clashes that it may be desirable to suppress in every type of CAD project.

Previous approaches for automating suppression of unwanted clashes typically involved rule templates that included one or more fields in which the user was required to fill in specific values or wildcard expressions. These specific values or wildcard expressions were used to specify element categories, values, and the like. For example, referring back to FIG. 2, assume a user desires to automatically suppress clashes between any gaskets and pipes, such as the clash between the gasket element 210 and the pipe element 220. The use could select a template that is designed to suppress clashes based on an element characteristic and fill in a wildcard expression that indicates element type includes the word "Gasket", to create a clash suppression rule that suppresses clashes whenever one of the clashing elements is a gasket.

While such traditional crash suppression rule templates that required specific values or wildcard expressions provide a mechanism for users to setup basic clash suppression rules, they have a number of shortcomings. A user is typically confined to a limited number of rule templates that is included with the design review software application. In order to setup a new type of clash suppression rule for which a rule template is not provided, the user may need to request a custom software update, which is typically an expensive and time consuming operation. Even if such expense is born, and a custom rule template added whenever there is a need for different combinations of criteria, at some point the sheer number of rule templates becomes unwieldy, and overwhelms the user with too many choices.

Further, in some cases, criteria for clash suppression may be too complex to realize using traditional rule templates that required specific values or wildcard expressions. One example of complex criteria involves geometric relationships of connection points. FIG. 4A is a view of an example CAD project 300 including a branch connection composed of two connected pipe elements 410, 420 whose clash is desired to be suppressed. FIG. 4B is a diagram 450 showing connection points of the pipe elements 410, 420 of FIG. 4A. The first pipe element 410 has connection points 460, 470 and the second pipe element 420 likewise has connection points 480, 490. One may desire to suppress clashes when any one of the connection points of one of the pipe elements lies in a line joining the connection points of the other pipe element. Such suppression intent may be very difficult to represent using a traditional rule template.

Accordingly, there is a need for improved techniques for suppressing unwanted clashes between elements of a CAD project that may address some or all of these shortcomings.

SUMMARY

In the embodiments described herein, techniques are provided for suppressing unwanted clashes between elements of a CAD project that involve clash suppression scripts written in a scripting language (e.g., Javascipt or Typescript). Element data may be maintained in a relational database (e.g., a SQL database) that is accessible through abstraction-based queries (e.g., ECSQL queries involving class, relationship and property abstractions). Scripts for a number of predefined clash suppression rule templets may be provided that include abstraction-based queries (rather than just specific values or wildcard expressions) along with control flow statements and other programming constructs. Further, an application program interface (API) may be provided to receive user-defined (e.g., user edited or user-created) scripts for additional clash suppression rules that include abstraction-based queries along with control flow statements and other programming constructs. When the script of a clash suppression rule is executed for a given clash, its abstraction-based query may be mapped to a query (e.g., a SQL query) on the underlying data tables of the relational database (e.g., SQL database), and the control flow statements and other programming constructs used to evaluate the returned data to determine if the given clash is an unwanted clash that should be suppressed. By the user editing existing scripts or creating entirely new scripts for clash suppression rules, unique class suppression intents beyond what is contemplated by the predefined clash suppression rule templets may be represented, without expensive and time consuming custom software updates. Likewise, using the power of the scripting language, very complex suppression intents may be represented.

In one specific embodiment, an API of a design review software application receives a user-defined script (e.g., a Javascript or Typescript script) for a clash suppression rule that includes at least an abstraction-based query (e.g., a ECSQL query referencing classes, relationships and properties), control flow statements and calls to one or more helper utilities. The design review software application executes the user-defined script for a given clash by mapping the abstraction-based query to a query (e.g., a SQL query) of a relational database (e.g., a SQL database) that maintains element data for the CAD project. The mapping maps classes to underlying data tables of the relational database, relationships to foreign key constraints or link tables of the relational database, and properties to columns of the underlying data tables. The relational database returns any element data found in response to the query, which is evaluated using the control flow statements and helper utilities called by the script. If valid element data is found, or element data when evaluated by a helper utility meets certain criteria, the clash suppressed.

It should be understood that a variety of additional features and alternative embodiments may be implemented other than those discussed in this Summary. This Summary is intended simply as a brief introduction to the reader for the further description which follows, and does not indicate or imply that what is mentioned herein covers all aspects of the disclosure, or are necessary or essential aspects of the disclosure.

BRIEF DESCRIPTION OF THE DRAWINGS

The description refers to the accompanying drawings of example embodiments, of which:

FIGS. 9A-C show a listing of an example user-defined script that may be received via an API of a design review software application.

DETAILED DESCRIPTION

Figure 5:
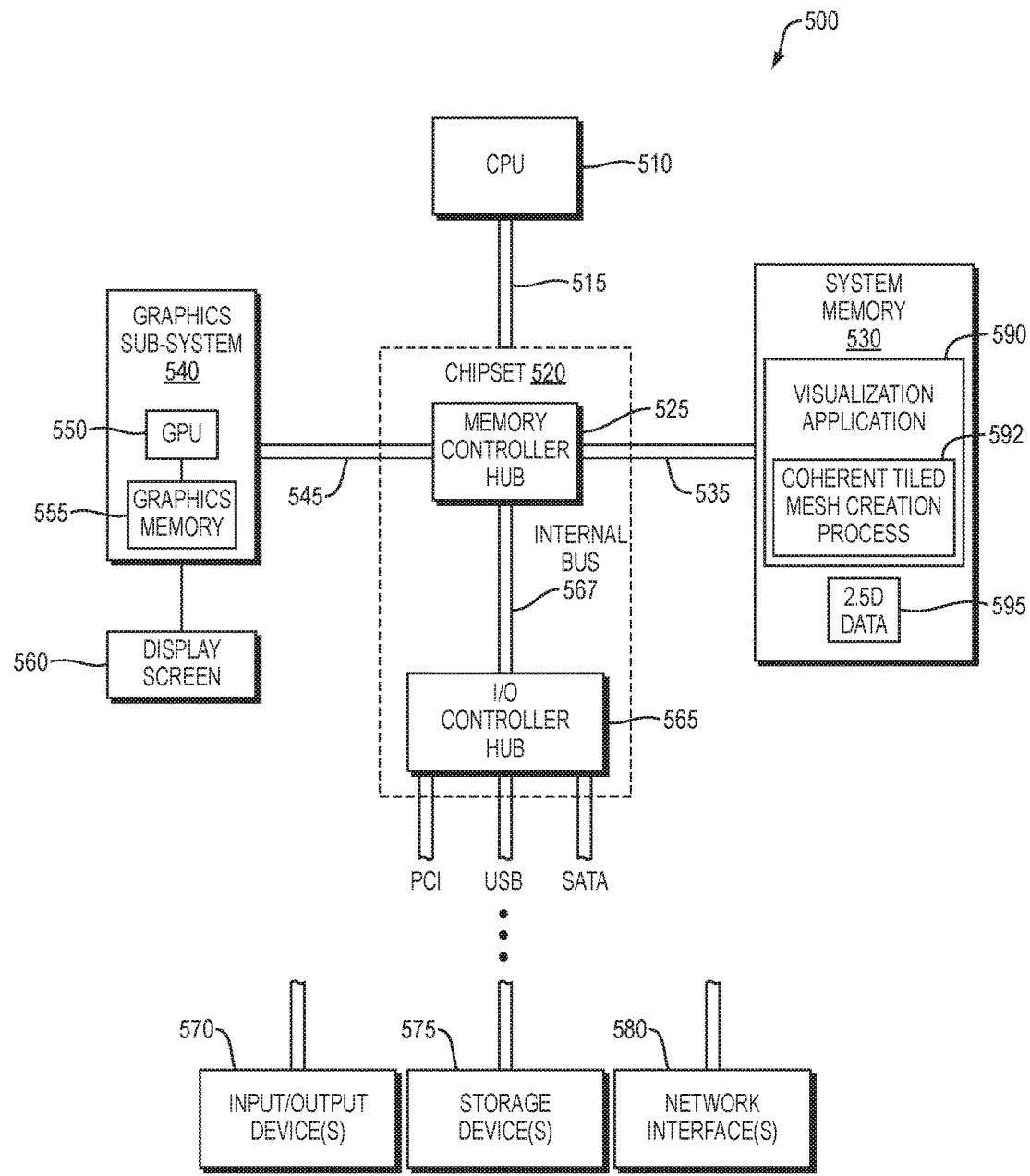
FIG. 5 is a block diagram of an example electronic device that may be used with the present techniques.

FIG. 5 is a block diagram of an example electronic device 500 (e.g., an example computer) that may be used with the present techniques. The electronic device includes a central processing unit (CPU) 510 coupled to a chipset 520 by a front side bus 515. The chipset 520 includes a memory controller hub 525 that is responsible for communications with high-speed devices such as system memory 530 and a graphics subsystem (e.g., a graphics card) 540. The memory controller hub 525 is coupled to the system memory 530 by a high-speed memory bus 535. The system memory 530 is typically volatile memory, such as a Random Access Memory (RAM), which is adapted to store a wide range of software and data being actively used by the CPU 510. The memory controller hub 525 is coupled to a graphics subsystem 540 (e.g., a graphics card) by a high-speed graphics bus 545. The graphics subsystem 540 includes a GPU 550 and graphics memory 555, among other components. The graphics subsystem 540 is coupled to at least one display screen 560.

The chipset 520 further includes an input/output controller hub 565 coupled to the memory controller hub by an internal bus 567. Among other functions, the input/output controller hub 565 may support a variety of types of peripheral buses, such as a peripheral component interconnect (PCI) bus, a universal serial bus (USB) bus, and/or a Serial Advanced Technology Attachment (SATA) bus, for connecting to other system components. The system components may include one or more I/O devices 570, such as a keyboard, a mouse, a removable media drive, etc., one or more persistent storage devices 575, such as a hard disk drive, a solid-state drive, or another type of persistent data store, one or more network interfaces 580, such as an Ethernet interface or a Wi-Fi adaptor, among other system components. The network interface(s) 580 allow communication with other electronic devices over a computer network, such as the Internet, to enable various types of collaborative, distributed, or remote computing.

Working together, the components of the electronic device 500 (and other electronic devices in the case of collaborative, distributed, or remote computing) may execute a number of different types of software applications for creating and/or reviewing CAD projects. These software applications may include a design review software application 590 that operates upon design data of a CAD project. The design review software application 590 is loaded from a storage device 575 to the system memory 530 when needed, and provided to the CPU 510 and other system components. In one specific implementation, the design review software application 590 is the Bentley Navigator® design review software application available from Bentley Systems, Inc. of Exton, Pa. The design data may include a relational database 595 (e.g., a SQL database) that persistently stores element data. In one specific implementation, the relational database is managed by SQLite™ relational database management system software. The relational database 595 exposes element data through a schema that includes abstractions that are mapped to underlying data tables, link tables or foreign key constraints of the relational database.

Figure 6:
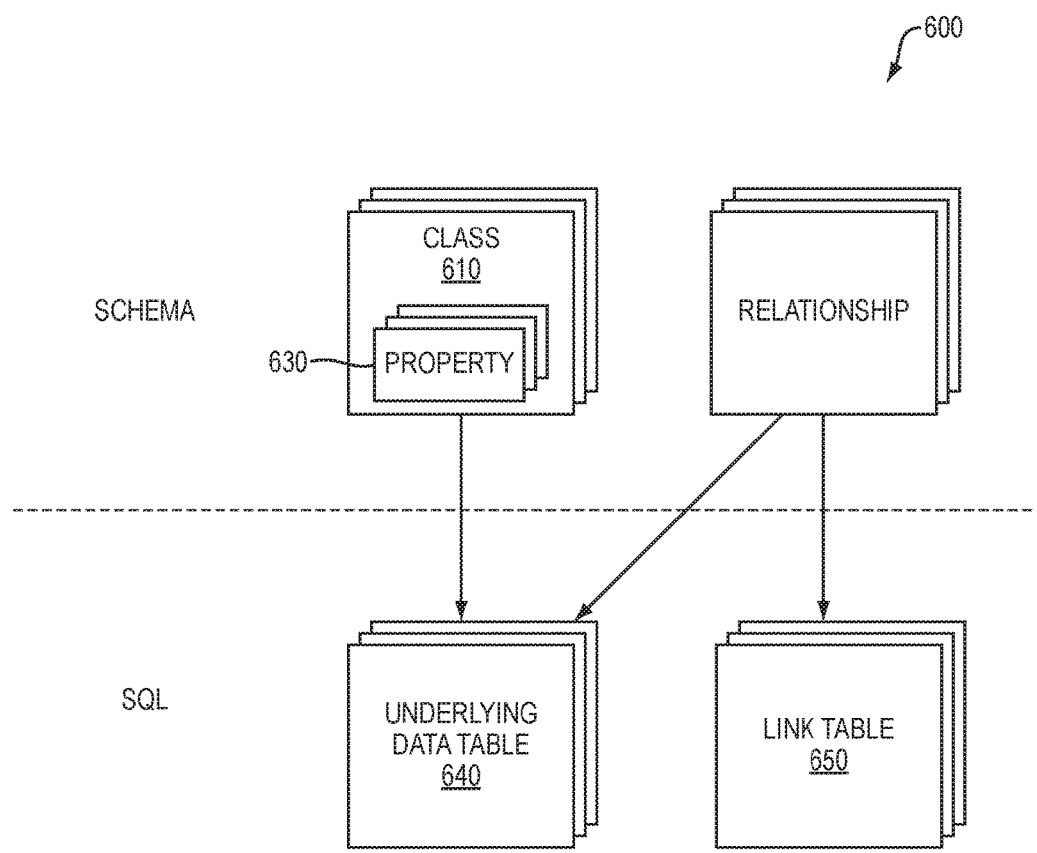
FIG. 6 is a diagram illustrating a mapping of abstractions exposed through a schema to underlying data tables, and link tables or foreign key constraints, of a relational database.

FIG. 6 is a diagram 600 illustrating a mapping of abstractions 610-630 exposed through the schema to underlying data tables 640 and link tables 650 or foreign key constraints of the relational database 595. The abstractions include classes 610 that represent categories of elements (e.g., a Pipe class, Flange class, Gasket class, etc.) and relationships 620 which represent interconnections or associations between elements (e.g., a Component-Connected-To-Component relationship, Equipment-Has-Nozzle-relationship, etc.). The abstractions also include properties 630 that represent information specific to a class that describes aspects of that category of elements (e.g., a size property, material property, rating property etc.). The classes 610 are mapped to underlying data tables 640 having rows that correspond to elements. The relationships 620 are mapped to underlying foregoing key constraint or link tables 650 that relate rows of different ones of the underlying data tables 640. The properties 630 are mapped to columns of underlying data tables. Through the use of the abstractions 610-630, the information of underlying data tables 640 may be accessed without knowledge of the precise table arrangements.

Figure 1:
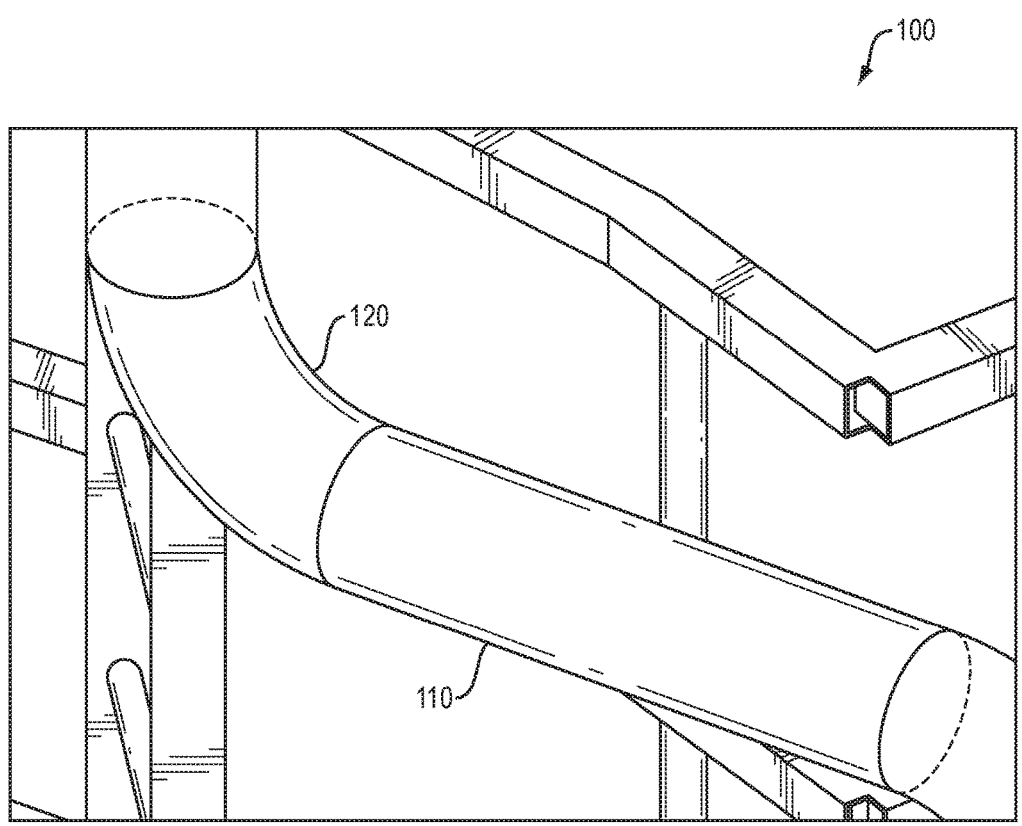
FIG. 1 is a view of an example CAD project including an example elbow element and pipe element that clash because they intentionally touch.
Figure 2:
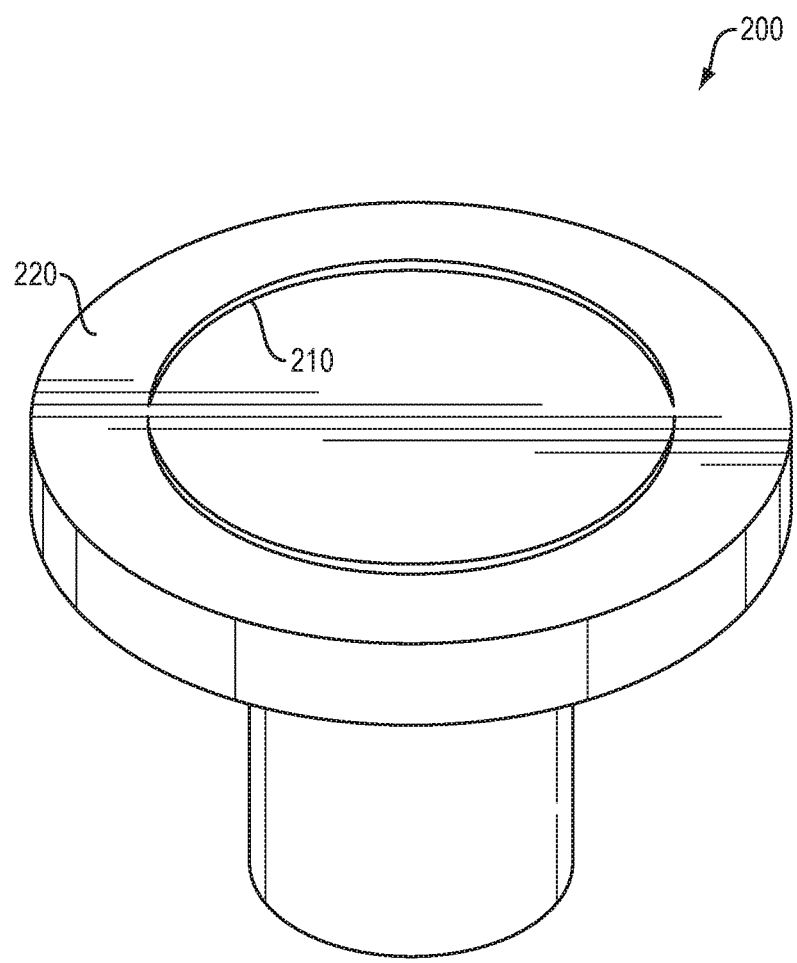
FIG. 2 is a view of an example CAD project including a gasket element and a pipe element that clash due to an approximation.
Figure 3:
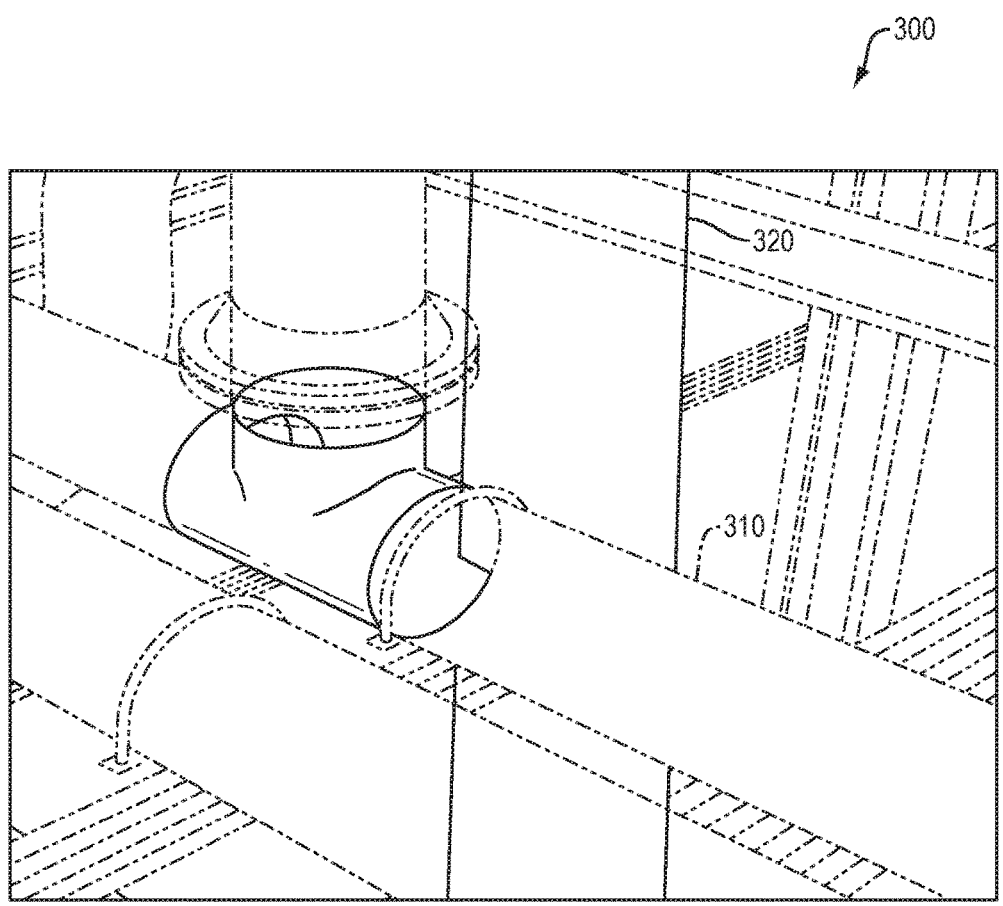
FIG. 3 is a view of an example CAD project including a first pipe element and a second pipe element that clash due to an unintentional collision.
Figure 7:
FIG. 7 is a listing of example relationships and properties of an example elbow element from FIG. 1 that may be exposed through a schema.

FIG. 7 is a listing of example relationships and properties of the example elbow element 110 from FIG. 1 that may be exposed through the schema. As can be seen, among other relationships, the elbow element 110 is shown to have a Component-Connected-To-Component relationship with the pipe element 120. Likewise, among other properties, the elbow element 110 has a size of "8" inches 710, is "Schedule 40" 730, has an insulation type of "AA" 740, etc.

The design review software application 590 may provide a number of predefined clash suppression rule templets that are based on scripts that utilize the abstractions exposed through the schema. These scripts are written in a scripting language (e.g., Javascript or Typescript) and include abstraction-based queries specified in a query language (e.g., ECSQL), together with predefined control flow statements and, in some cases, calls to helper utilities, such as geometry evaluation utilities. While the control flow statements and calls to helper utilities are pre-provided in predefined clash suppression rule templets, the abstraction-based queries (e.g., ECSQL queries) may be user-provided (e.g., in a user interface of the design review software application 590). When a script is executed for a clash, its abstraction-based query (e.g., ECSQL query) is mapped to a query (e.g., a SQL query) on the underlying data tables of the relational database 595. If valid element data is found in a row, or element data, when evaluated by a helper utility, meets a certain criteria, the clash suppressed.

Figure 8A:
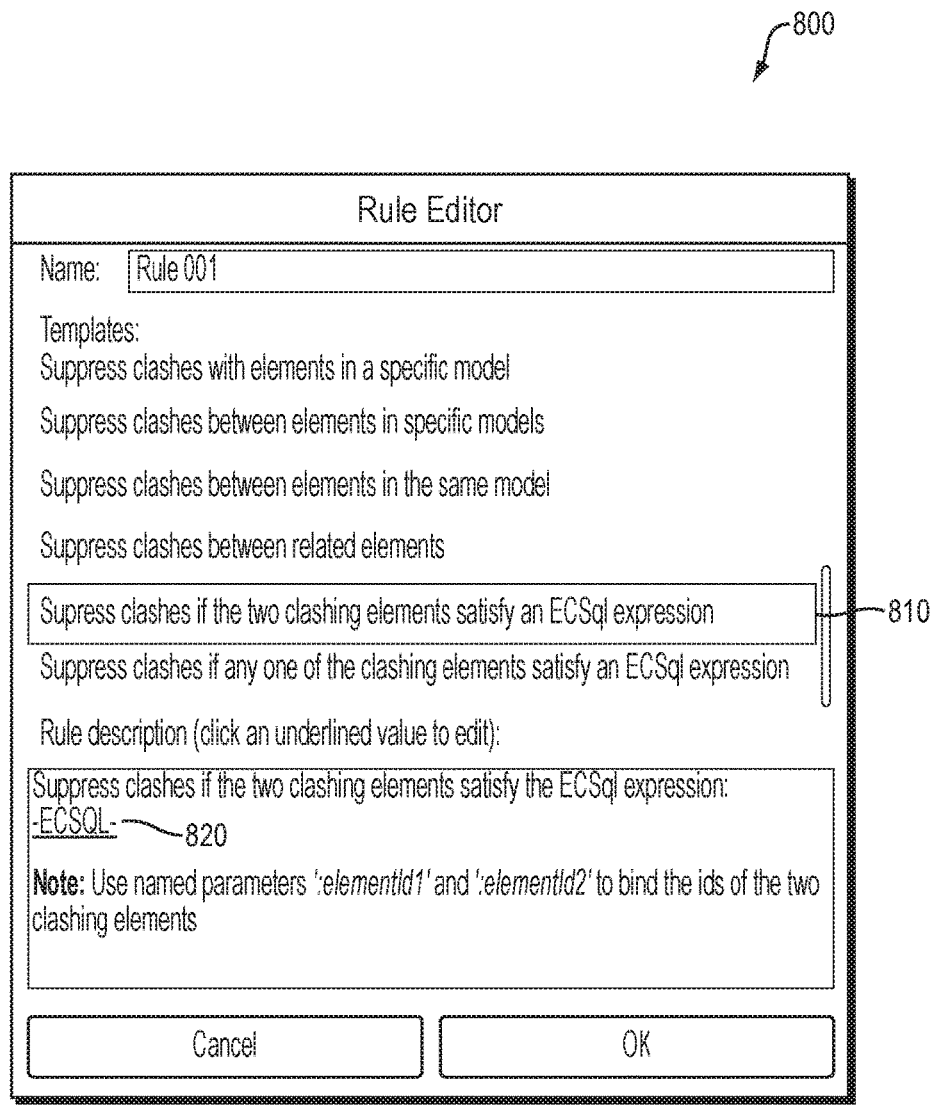
FIGS. 8A and 8B are user interface screens of a design review software application that may be used to select a predefined clash suppression rule templet and edit an abstraction-based query.
Figure 8B:
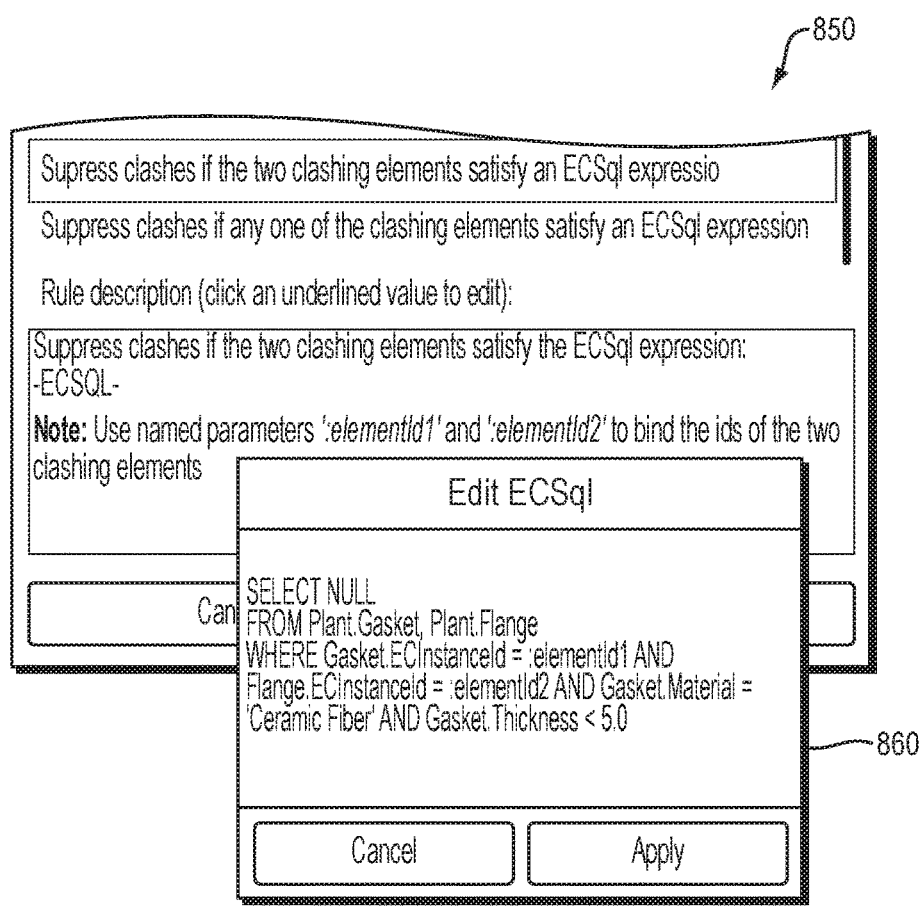

FIGS. 8A and 8B are user interface screens 800, 850 of the design review software application 590 that may be used to select a predefined clash suppression rule templet and provide its abstraction-based query (e.g., ECSQL query). Upon selection of a given predefined rule templet 810, a link 820 is provided which triggers the display of a window 860 for the abstraction-based query to be used. In this specific example, the predefined rule templet 810 is for suppressing clashes between gaskets and flanges, and the abstraction-based query is a ECSQL expression provided by the user that accesses material and thickness properties of a Gasket class to determine if the gasket is made of "Ceramic Fiber" and has a thickness of "<5.0".

In addition to including a user interface for specifying abstraction-based queries for predefined clash suppression rule templets, the design review software application 590 may include an API for receiving user-defined (e.g., user edited or user-created) scripts written in a scripting language (e.g., Javascript or Typescript). A user may edit existing scripts to change not only their abstraction-based queries (e.g., ECSQL queries) but also their predefined control flow statements and/or calls to helper utilities, or define entirely new scripts and specify from scratch their abstraction-based queries, control flow statements and/or calls to helper utilities. In such manner, unique and potentially very complex suppression intents may be represented. User-defined scripts may be edited or created in a user-interface of the design review software application 590 or in a separate text editor. Like predefined clash suppression rule templets, when a user-defined script is executed for a clash its abstraction-based query (e.g., ECSQL query) is mapped to a query (e.g., a SQL query) on the underlying data tables of the relational database 595. If valid element data is found in a row, or element data, when evaluated by a helper utility, meets a certain criteria, the clash suppressed.

Figure 4A:
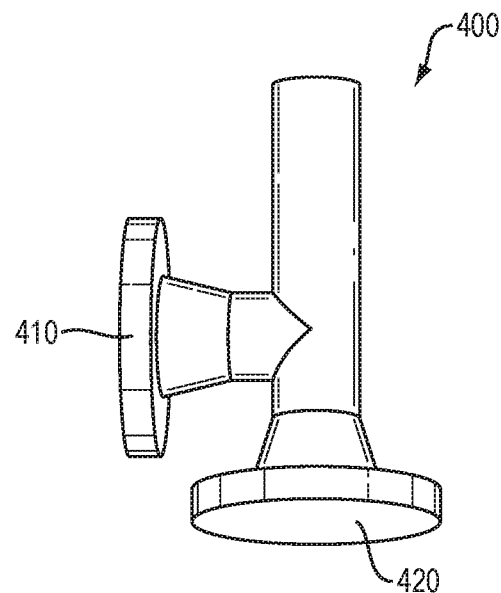
FIG. 4A is a view of an example CAD project including a branch connection composed of two connected pipe elements whose clash is desired to be suppressed.
Figure 4B:
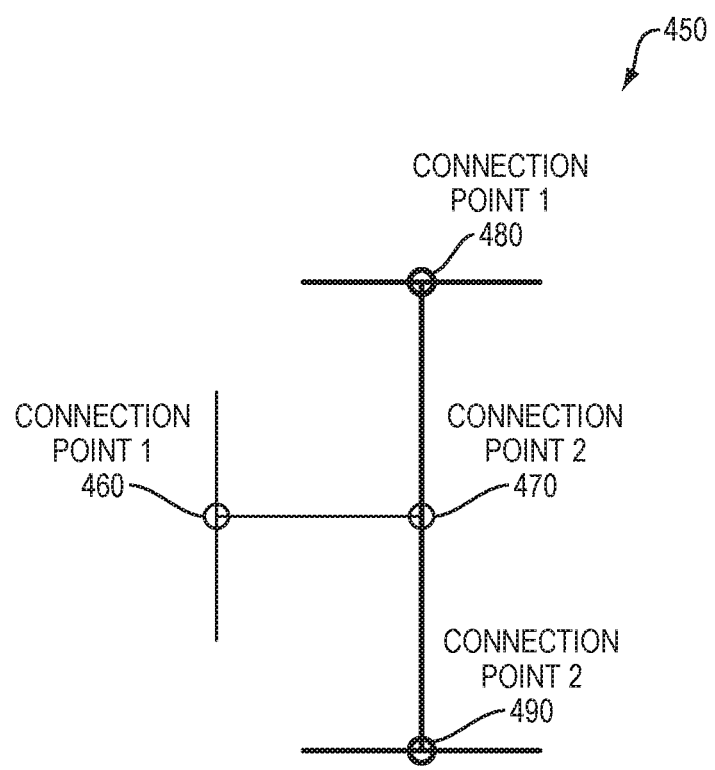
FIG. 4B is a diagram showing connection points of the pipe elements of FIG. 4A.

FIGS. 9A-C show a listing of an example user-defined script 900 that may be received via the API of the design review software application 590. Such script may address the complex cash suppression criteria discussed above in reference to the example of FIGS. 4A and 4B, involving a branch connection and a desire to suppress clashes when any one of the connection points of one of the pipe elements lies in a line joining the connection points of the other pipe element. In the example user-defined script 900, a "process" method first executes an abstraction-based query (e.g., ECSQL query) to fetch connection points of the two pipe elements. The example user-defined script 900 then calls a helper utility that evaluates geometry to determine if any one of the connection points of the first element lies in a line joining the connection points of the second element, within a specified tolerance parameter.

Figure 10:
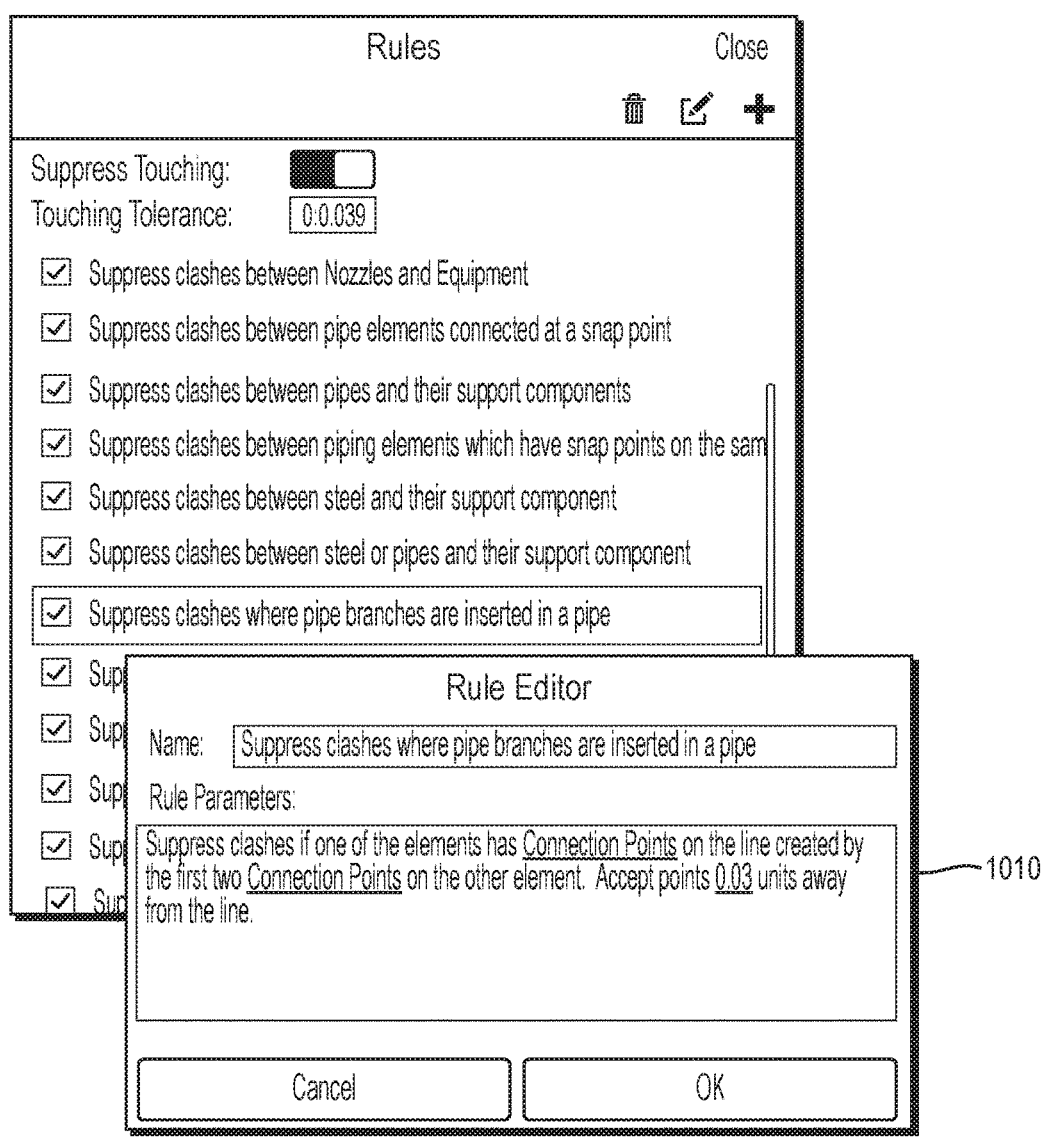
FIG. 10 is an example user interface screen of a design review software application showing the example user-defined script of FIG. 9 added to a rules listing.

FIG. 10 is an example user interface screen 1000 of the design review software application 590 showing the example user-defined script 900 of FIG. 9 added to a rules listing. Similar to predefined clash suppression rule templets, upon selection of the rule, a window 1010 is provided to specifying rule parameters, such as the tolerance parameter.

In summary, the above description details techniques suppressing unwanted clashes between elements of a CAD project. It should be understood that various adaptations and modifications may be readily made to what is described above, to suit various implementations and applications. While it is discussed above that many aspects of the techniques may be implemented in software (e.g., as executable instructions stored in a non-transitory electronic device readable medium for execution on one or more processors), it should be understood that some or all of the techniques may also be implemented in hardware. A hardware implementation may include specially configured logic circuits and/or other types of hardware components. Above all, it should be understood that the above descriptions are meant to be taken only by way of example.

What is claimed is:

1. A method for suppressing unwanted clashes between elements of a computer aided design (CAD) project, comprising:
   receiving, by a software application executing on an electronic device, a user-defined script for a clash suppression rule that includes at least an abstraction-based query and control flow statements, the abstraction based query including classes and relationships;
   executing, by the software application, the user-defined script for a given clash between two or more elements by
      mapping the abstraction-based query to a query of a relational database that maintains element data for the CAD project, the mapping to map classes to underlying data tables and relationships to foreign key constraints or link tables of the relational database,
      returning element data from the relational database in response to the query, and
      evaluating the returned element data using the control flow statements to determine whether the given clash is an unwanted clash; and
   suppressing the given clash in response to determining the given clash is an unwanted clash.

2. The method of claim 1, wherein the abstraction based query further specifies one or more properties and the mapping maps the properties to columns of the underlying data tables.

3. The method of claim 1, wherein the user-defined script also includes calls to one or more helper utilities for evaluating geometric relationships among elements, and the evaluating the returned element data further comprises using the helper utilities.

4. The method of claim 1, wherein the evaluating the returned element data comprises determining whether the query of the relational database returned a valid data from a row.

5. The method of claim 1, wherein the user-defined script is a user-edited version of a predefined script provided by the software application.

6. The method of claim 1, wherein the user-defined script is a newly-created script.

7. The method of claim 1, wherein the user-defined script is written in at least one of Javascript or Typescript.

8. The method of claim 1, wherein the relational database is a SQL database and the query is a SQL query.

9. The method of claim 1, wherein the abstraction-based query is a ECSQL query.

10. An electronic device comprising:
    a display screen;
    a processor; and
    a memory coupled to the processor configured to store a relational database maintaining elements of a computer aided design (CAD) project and a design review software application, software of the design review software application configured when executed to:
       process a user-defined script for a clash suppression rule that includes at least an abstraction-based query and control flow statements,
       execute the user-defined script for a given clash between two or more elements by mapping the abstraction-based query to a query of a relational database that maintains element data for the CAD project, returning element data from the relational database in response to the query, and evaluating the returned element data using the control flow statements to determine whether the given clash is an unwanted clash, and
       suppress the given clash in a user interface of the design review software application on the display screen, in response to the given clash being an unwanted clash.

11. The electronic device claim 10, wherein the abstraction based query further specifies one or more properties and the mapping maps the properties to columns of underlying data tables.

12. The electronic device claim 10, wherein the user-defined script also includes calls to one or more helper utilities for evaluating geometric relationships among elements, and the evaluating the returned element data further comprises using the helper utilities.

13. A non-transitory electronic device-readable medium having instructions stored thereon that when executed on one or more processors are operable to:
    receive a user-defined script for a clash suppression rule that includes at least an abstraction-based query and control flow statements;
    execute the user-defined script for a given clash between two or more elements by mapping the abstraction-based query to a query of a relational database that maintains element data for a CAD project,
    returning element data from the relational database in response to the query, and evaluating the returned element data using the control flow statements to determine whether the given clash is an unwanted clash; and
    suppress the given clash in response to determining the given clash is an unwanted clash.

14. The non-transitory electronic device-readable medium of claim 13, wherein the abstraction based query further specifies one or more properties and the mapping maps the properties to columns of the underlying data tables.

15. The non-transitory electronic device-readable medium of claim 13, wherein the user-defined script also includes calls to one or more helper utilities for evaluating geometric relationships among elements, and the evaluating the returned element data further comprises using the helper utilities.

16. The non-transitory electronic device-readable medium of claim 13, wherein the evaluating the returned element data comprises determining whether the query of the relational database returned a valid data from a row.

17. The non-transitory electronic device-readable medium of claim 13, wherein the user-defined script is a user-edited version of a predefined script provided by the software application.

18. The non-transitory electronic device-readable medium of claim 13, wherein the user-defined script is a newly-created script.

19. The non-transitory electronic device-readable medium of claim 13, wherein the user-defined script is written in at least one of Javascript or Typescript, the relational database is a SQL database, and the query is a SQL query.

20. The non-transitory electronic device-readable medium of claim 13, where the abstraction based query includes classes and relationships, and the mapping maps classes to underlying data tables and relationships to foreign key constraints or link tables of the relational database.

* * * * *